(12) United States Patent
Lee et al.

(10) Patent No.: US 11,488,317 B2
(45) Date of Patent: Nov. 1, 2022

(54) NEURAL NETWORK MODEL BASED DEPTH ESTIMATION

(71) Applicant: SONY GROUP CORPORATION, Tokyo (JP)

(72) Inventors: Jong Hwa Lee, San Diego, CA (US); Gareth White, San Diego, CA (US); Antti Myllykoski, San Diego, CA (US); Edward Theodore Winter, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 51 days.

(21) Appl. No.: 17/102,273

(22) Filed: Nov. 23, 2020

(65) Prior Publication Data
US 2022/0164973 A1   May 26, 2022

(51) Int. Cl.
*G06T 7/55* (2017.01)
*G06T 15/20* (2011.01)

(52) U.S. Cl.
CPC ............. *G06T 7/55* (2017.01); *G06T 15/20* (2013.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2012/0163672 | A1 | 6/2012 | McKinnon | |
| 2014/0122381 | A1* | 5/2014 | Nowozin | G06N 20/00 706/12 |
| 2015/0248764 | A1 | 9/2015 | Keskin et al. | |
| 2017/0262768 | A1 | 9/2017 | Nowozin et al. | |
| 2021/0049203 | A1* | 2/2021 | Gupta | G06F 16/56 |

OTHER PUBLICATIONS

Sola, et al., "Image-to-Image Translation with Conditional Adversarial Networks", IEEE Conference on Computer Vision and Pattern Recognition (CVPR), Nov. 9, 2017, 17 pages.
International Search Report and Written Opinion of PCT Application No. PCT/IB2021/060891, dated Mar. 3, 2022, 11 pages of ISRWO.

(Continued)

*Primary Examiner* — Peter Hoang
(74) *Attorney, Agent, or Firm* — Chip Law Group

(57) ABSTRACT

A system is provided that stores a neural network model trained on a training dataset which indicates an association between first graphic information associated with one or more first objects and corresponding first plurality of depth images. The system receives second graphic information that corresponds to the one or more first objects. The system further applies the trained neural network model received on the second graphic information. The system predicts a first depth image from the first plurality of depth images based on the application of the trained neural network model on the received second graphic information. The system extracts first depth information from the predicted first depth image. The first depth information corresponds to the one or more first objects indicated by the second graphic information.

18 Claims, 5 Drawing Sheets

(56) References Cited

OTHER PUBLICATIONS

Alhashim, et al., "High Quality Monocular Depth Estimation via Transfer Learning", Computer Vision and Pattern Recognition, Cornell University Library, New York, Mar. 10, 2019, 12 pages.
Martinez-Gonzalez, et al., "UnrealROX: an extremely photorealistic virtual reality environment for robotics simulations and synthetic data generation", Virtual Reality, vol. 24, No. 2, Aug. 13, 2019, pp. 271-288.

* cited by examiner

NEURAL NETWORK MODEL BASED DEPTH ESTIMATION

CROSS-REFERENCE TO RELATED APPLICATIONS/INCORPORATION BY REFERENCE

None.

FIELD

Various embodiments of the disclosure relate to a neural network model. More specifically, various embodiments of the disclosure relate to a system and a method for neural network model based depth estimation.

BACKGROUND

Conventionally, range imaging applications are used for depth estimation. The range imaging applications may utilize various types of depth sensors (such as a time-of-flight (ToF) sensor, a light detection and ranging (LiDAR) sensor or a structured light sensor) for the depth estimation of objects present in a real environment. The depth sensor may capture one or more images of the objects present in the real environment from different viewpoints. The processing of such images captured by the depth sensor to obtain the depth information may be a complex task. Moreover, the depth sensors employed by the range imaging applications may be expensive, not easily available, and structurally difficult to implement.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for neural network model based depth estimation, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
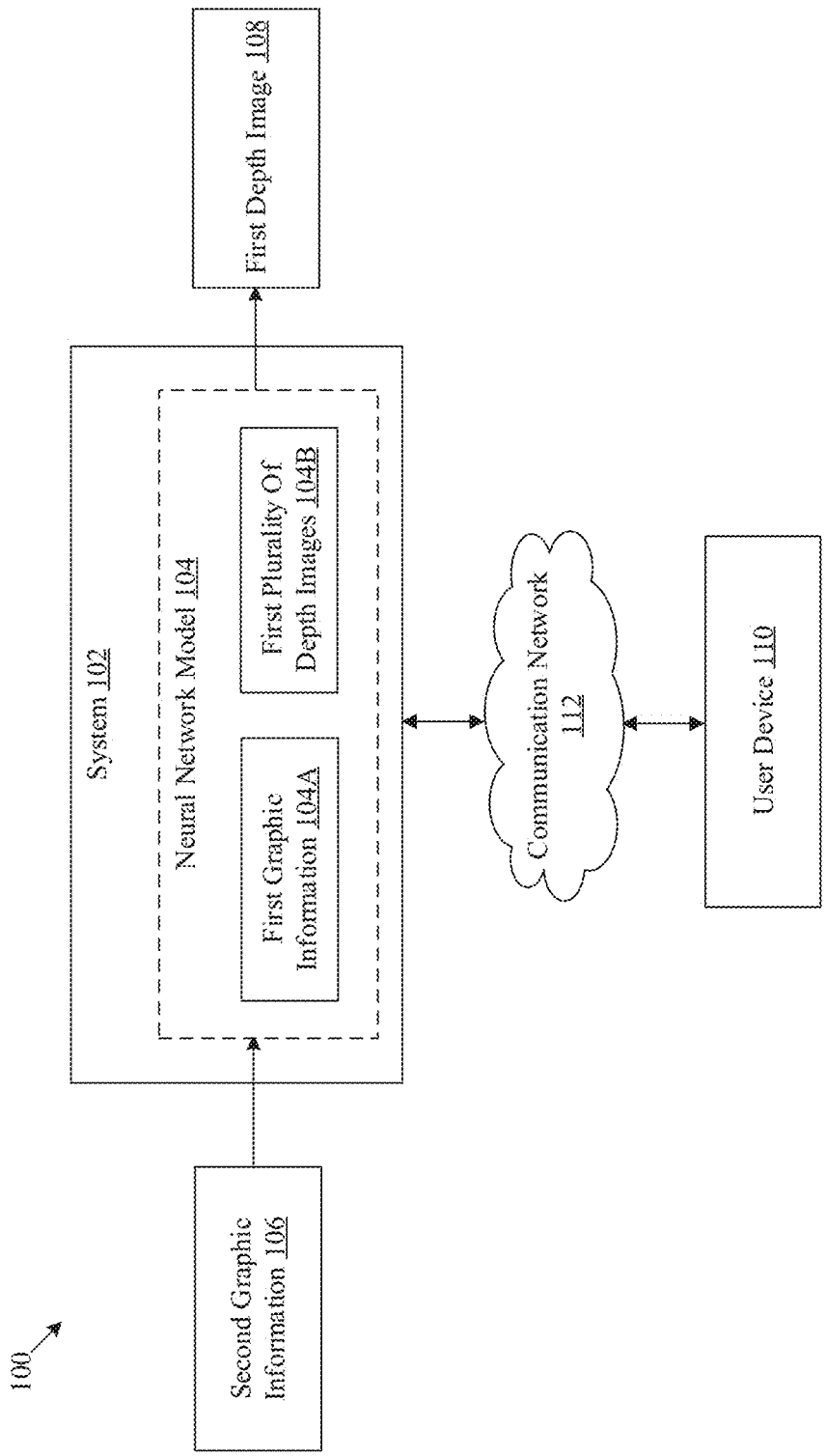
FIG. 1 is a diagram of an exemplary network environment for neural network model based depth estimation, in accordance with an embodiment of the disclosure.

The following described implementations may be found in the disclosed system and method for neural network model based depth estimation. Exemplary aspects of the disclosure provide a system configured to train a neural network model. The neural network model may be trained on a training dataset. The training dataset may include first graphic information and corresponding first plurality of depth images associated with one or more first objects (for example, infrastructure, furniture, human beings, other animate and inanimate objects). Examples of the first graphic information may include, but are not limited to, images, point cloud data, voxel information or computer-generated imagery (CGI) information associated with the one or more first objects. The first plurality of depth images may include depth information of the one or more first objects depicted in the first graphic information.

The neural network model may be trained to learn mapping between the first graphic information and the corresponding first plurality of depth images, for depth estimation of the one or more first objects. Thus, the disclosed system may train the neural network model that may be configured to output depth images (such as time-of-flight (TOF) images) associated with the one or more first objects, based on input of graphic information (i.e. in one or more formats such as the images, the point cloud data, or a set of voxels, and so forth) to the trained neural network model.

The trained neural network model may be stored in the disclosed system. The system may further receive second graphic information (for example new graphic information) that may correspond to the one or more first objects. For example, the second graphic information may be an image associated with the one or more first objects (such as a chair). It may be noted that the second graphic information may be same (or substantially same) as the first graphic information of the training dataset or it may be different information than the first graphic information on which the neural network model may be trained.

The system may further apply the neural network model on the received second graphic information. The trained neural network model may map the received second graphic information with the first plurality of depth images of the training dataset. The system may further control the trained neural network model to predict a first depth image from the first plurality of depth images based on the application of the neural network model on the received second graphic information. The system may further extract first depth information from the predicted first depth image. The first depth information may include depth information of the one or more first objects depicted in the second graphic information.

Therefore, the disclosed system may allow prediction of the depth information associated with the one or more first objects, by use of the trained neural network model. Thus, a need of using depth sensors, such as a time-of-flight (ToF) sensor which may be expensive and structurally difficult to implement may be eliminated, to determine the depth information associated with objects indicated in the second graphic information. Further, the disclosed system may provide a less expensive and computationally efficient prediction of the depth information as compared to depth information capture directly performed by the depth sensors.

Moreover, the system may utilize the neural network model (i.e. trained on a large training dataset of various objects and their various viewpoints) for the prediction of the depth information that may be time efficient as compared to the conventional depth sensors.

FIG. 1 is a diagram of an exemplary network environment for neural network model based depth estimation, in accordance with an embodiment of the disclosure. With reference to FIG. 1, there is shown a block diagram of a network environment 100. The network environment 100 may include a system 102. The system 102 may include a neural network model 104. The neural network model 104 may be trained on a training dataset that may include an associated between the first graphic information 104A and the first plurality of depth images 104B. The network environment 100 may further include second graphic information 106 and a first depth image 108. The network environment 100 may further include a user device 110 and communication network 112.

The system 102 may include suitable logic, circuitry, interfaces, and/or code that may be configured to train the neural network model 104, based on a training dataset which may indicate an association between the first graphic information 104A associated with one or more first objects and corresponding first plurality of depth images 104B. The system 102 may be further configured to predict first depth image 108 from the first plurality of depth images 104B. The system 102 may further extract first depth information from the predicted first depth image 108 associated with the one or more first objects. Examples of the system 102 may include, but are not limited to, an animation system, a computer graphics engine, a computing device, a laptop, a mainframe machine, a server, a computer work-station, a smartphone, a cellular phone, a mobile phone, a gaming device and/or a consumer electronic (CE) device.

The neural network model 104 may be a computational network or a system of artificial neurons, arranged in a plurality of layers, as nodes. The plurality of layers of the neural network model 104 may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network model 104. Outputs of each hidden layer may be coupled to inputs of at least one node in other layers of the neural network model 104. Node(s) in the final layer may receive inputs from at least one hidden layer to output a result. The number of layers and the number of nodes in each layer may be determined from hyper-parameters of the neural network model 104. Such hyper-parameters may be set before or while training the neural network model 104 on the training dataset.

Each node of the neural network model 104 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model 104. All or some of the nodes of the neural network model 104 may correspond to same or a different same mathematical function.

In training of the neural network model 104, one or more parameters of each node of the neural network model 104 may be updated based on whether an output of the final layer for a given input (from the training dataset) matches a correct result based on a loss function for the neural network model 104. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

The neural network model 104 may include electronic data, such as, for example, a software program, code of the software program, libraries, applications, scripts, or other logic or instructions for execution by a processing device, such as the system 102. The neural network model 104 may include code and routines configured to enable a computing device, such as the system 102 to perform one or more operations for the prediction of the depth information based on provided input (such as the second graphic information 106). Additionally or alternatively, the neural network model 104 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 104 may be implemented using a combination of hardware and software.

Examples of the neural network model 104 may include, but are not limited to, an image-to-image translation model, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the neural network model 104 may include numerical computation techniques using data flow graphs. In certain embodiments, the neural network model 104 may be based on a hybrid architecture of multiple Deep Neural Networks (DNNs). In some embodiments, the neural network model 204A may be an artificial intelligent (AI) engine.

The second graphic information 106 may include or correspond to an object (such as a chair) of the one or more first objects and may be captured or generated from one or more viewpoints. In accordance with an embodiment, the second graphic information 106 may correspond to one or more images, point cloud data, a set of voxels, a three-dimensional (3D) mesh, video information, LAS (LASer) format data or proprietary format data associated with the object of the one or more first objects. For example, the second graphic information 106 may be received from three-dimensional (3D) or stereo camera or a three-dimensional (3D) graphics engine. The second graphic information may be input to the trained neural network model 104 to predict or output the first depth image 108. The first depth image 108 may include depth information associated with the object of the one or more first objects included in the second graphic information 106. In accordance with an embodiment, the first depth image 108 may include depth information of the object from a same viewpoint as that of the viewpoint of the object in the second graphic information 106.

The user device 110 may include suitable logic, circuitry, and interfaces that may be configured to provide the second graphic information 106 to the neural network model 104 for prediction of the first depth image 108. The user device 110 may be further configured to receive the predicted first depth image 108 from the neural network model 104. Examples of the user device 110 may include, but are not limited to, a camera device, an animation engine, a computing device, a smartphone, a cellular phone, a mobile phone, a gaming device, a mainframe machine, a server, a computer workstation, and/or a consumer electronic (CE) device. In some embodiments, the trained neural network model 104 may be installed or deployed on the user device 110 for the prediction of the first depth image 108 based on the input second graphic information 106.

The communication network 112 may include a communication medium through which the system 102 and the user device 110 may communicate with each other. The communication network 112 may be one of a wired connection or a wireless connection Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols In operation, the system 102 may be configured to store the neural network model 104 trained on the training dataset which may indicate an association between first graphic information 104A associated with one or more first objects and corresponding first plurality of depth images 104B. The neural network model 104 may be trained for the mapping of the first graphic information 104A with the first plurality of depth images 104B to predict the depth information associated with the one or more first objects. The details of the training of the neural network model 104 are further provided, for example, in FIG. 3. The system 102 may further receive the second graphic information 106 that may correspond to the one or more first objects. The system 102 may receive the second graphic information 106 for extraction of the depth information associated with the one or more first objects depicted in the second graphic information 106. The details of the second graphic information 106 are further provided, for example, in FIG. 3.

The system 102 may be further configured to apply the trained neural network model 104 on the received second graphic information 106. The trained neural network model 104 may map the received second graphic information 106 with the association between the first graphic information 104A and the first plurality of depth images 104B of the training dataset for prediction of the depth information associated with the one or more first objects depicted in the second graphic information 106. The details of the application of the trained neural network model 104 to the second graphic information 106 are further provided, for example, in FIG. 3.

The system 102 may further predict the first depth image 108 (for example time-of-flight (TOF) image) from the first plurality of depth images 104B based on the application of the trained neural network model 104 on the received second graphic information 106. For example, the trained neural network model 104 may be an image-to-image translation model, that may be configured to predict the first depth image 108 from the second graphic information 106 (such as an image). The details of the control of the trained neural network model 104 to predict the first depth image 108 are provided, for example, in FIG. 3.

The system 102 may further extract the first depth information (for example distance information or XYZ information) from the predicted first depth image 108. The first depth information may correspond to the one or more first objects indicated in the second graphic information 106. In accordance with an embodiment, the first depth image 108 may include different color information for different depth values associated with the one or more first objects. The details of the extraction of the first graphic information 104A are further provided, for example, in FIG. 3.

In accordance with an embodiment, the system 102 may be further configured to receive a ground truth image corresponding to the received second graphic information 106. The ground truth image may indicate depth information associated with the one or more first objects depicted in the second graphic information 106. The system may compare the ground truth image and the first depth image predicted by the neural network model for generation of a first prediction score. The details of the generation of the first prediction score are further provided, for example, in FIG. 4. In accordance with an embodiment, the system may be further configured to extract the first depth information from the predicted first depth image 108, based on a determination that the first prediction score is more than or equal to a threshold score. The details of the determination of the first prediction score are further provided, for example, in FIG. 4.

Figure 2:
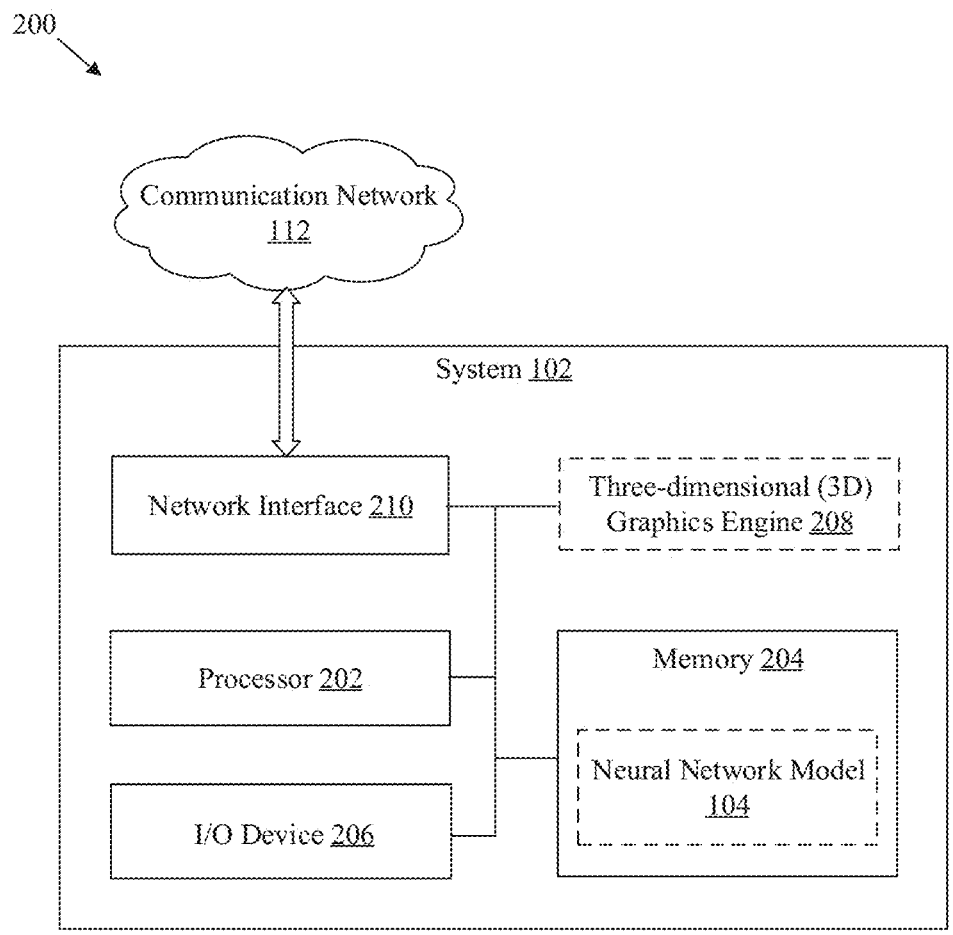
FIG. 2 is a block diagram of a system for neural network model based depth measurement, in accordance with an embodiment of the disclosure.

FIG. 2 is a block diagram of a system for neural network model based depth estimation, in accordance with an embodiment of the disclosure. FIG. 2 is explained in conjunction with elements from FIG. 1. With reference to FIG. 2, there is shown a block diagram 200 of the system 102. The system 102 may include a processor 202 and a memory 204. The memory 204 may further include the neural network model 104. The system 102 may further include the input/output (I/O) device 206, a three-dimensional (3D) graphics engine 208 and a network interface 210.

The processor 202 may include suitable logic, circuitry, and interfaces that may be configured to execute a set of instructions stored in the memory 204. The processor 202 may be configured to execute program instructions associated with different operations to be executed by the system 102. For example, some of the operations may include training the neural network model 104 for prediction of the first depth image 108. The processor 202 may be further configured to predict the first depth image 108 and extract the first depth information from the predicted first depth image 108. The processor 202 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 204 may include suitable logic, circuitry, interfaces, and/or code that may be configured to store the one or more instructions to be executed by the processor 202. The memory 204 that may be configured to store the training dataset and the neural network model 104. The memory 204 may be further configured to store, but is not limited to, the second graphic information 106, the first depth image 108 and one or more ground truth images. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input from a user and provide an output based on the received input. The I/O device 206 may be configured to receive the second graphic information 106 as input. The I/O device 206 may further display the first depth image 108 and the extracted first depth information. The I/O device 206 which may include various input and output devices, may be configured to communicate with the system 102, the 3D graphics engine 208 or the user device 110. Examples of the I/O device 206 may include, but are not limited to, a touch screen, a keyboard, a mouse, a joystick, a microphone, or a display device.

The 3D graphics engine 208 may include suitable logic, circuitry, interfaces and/or code that may be configured to generate the graphic information (such as the first graphic information 104A and the second graphic information 106) corresponding to the one or more first objects from different viewpoints (or examples different angles or positions). The 3D graphics engine 208 may further control a display device (such as included in the I/O device 206) to render the generated graphic information (for example images, 3D mesh, voxel information, or point cloud data) associated with the one or more first objects. The 3D graphics engine 208 may utilize a script generator (such as a python script generator) to generate or modify the graphic information. For example, the 3D graphics engine 208 may control the display device to render a first image of the one or more first objects captured by a depth sensor (such as a ToF sensor) or stereo camera from a first viewpoint. The 3D graphics engine 208 may further receive one or more user inputs, via the I/O device 206, to modify the rendered first image (i.e. generate the first graphic information 104A) for the one or more first objects from different viewpoints. The first graphic information 104A of the one or more first objects may include, but is not limited to, images (such as for a rotated object, resized object, re-positioned object), point cloud data, video information, voxel information, or 3D mesh. Examples of the 3D graphics engine 208 may include, but are not limited to, a 3D computer graphics engine, a 3D creation application, a 3D modelling or simulation application, a 3D animation engine, or a video editing application. Although in FIG. 2, the 3D graphics engine 208 is shown integrated with the system 102, the disclosure is not so limited. Accordingly, in some embodiments, the 3D graphics engine 208 may be separated from the system 102, without deviation from scope of the disclosure.

The network interface 210 may include suitable logic, circuitry, and interfaces that may be configured to facilitate communication between the system 102 and the user device 110, via the communication network 112. The network interface 210 may be implemented by use of various known technologies to support wired or wireless communication of the system 102 with the communication network 112. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Figure 3:
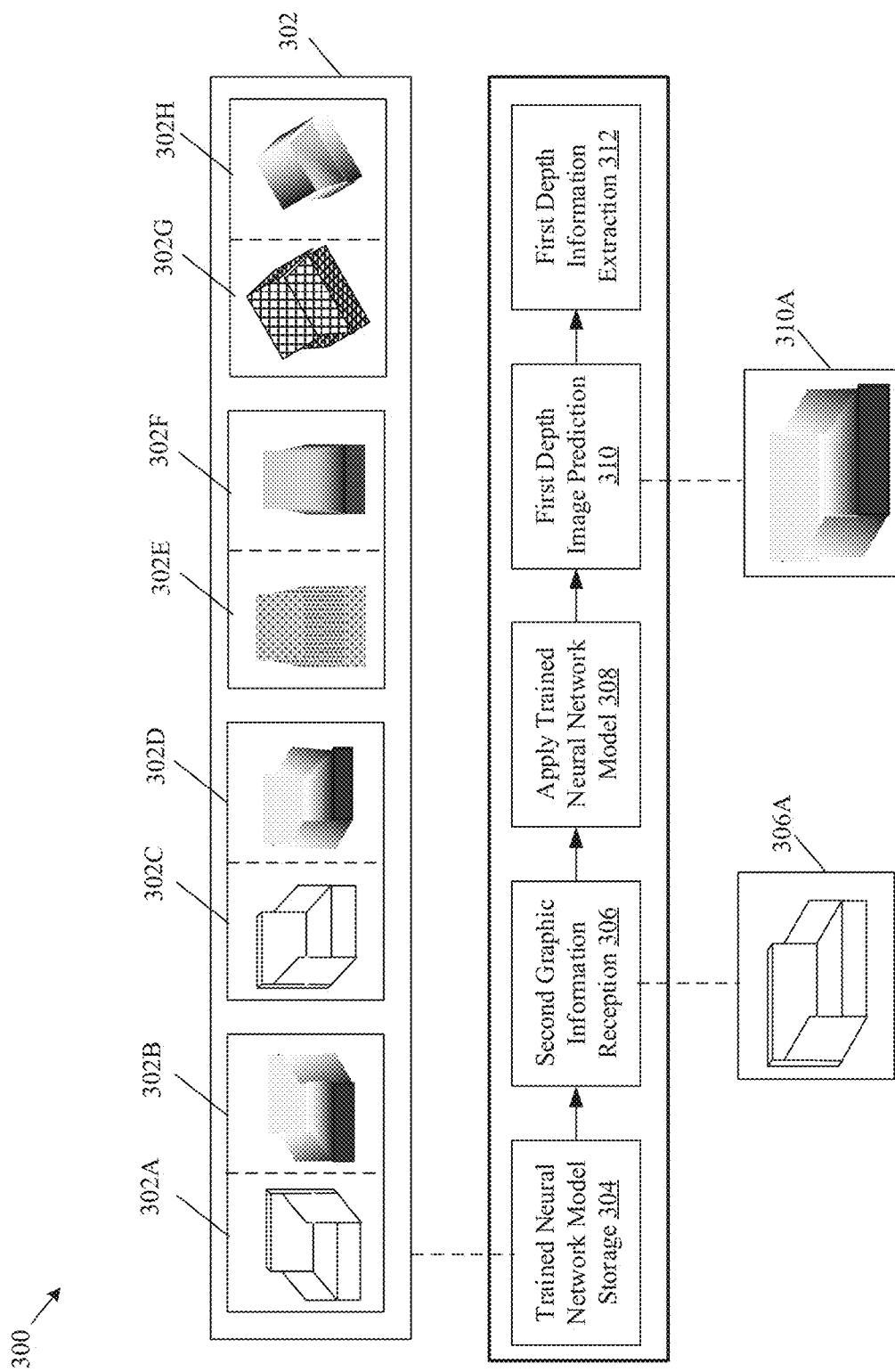
FIG. 3 is a sequence diagram for exemplary operations for neural network model based depth estimation, in accordance with an embodiment of the disclosure.

FIG. 3 is a sequence diagram for exemplary operations for neural network model based depth estimation, in accordance with an embodiment of the disclosure. FIG. 3 is explained in conjunction with elements from FIGS. 1 and 2. With reference to FIG. 3, there is shown a sequence diagram 300 that illustrates a sequence of operations from 304 to 312. The sequence of operations may be executed by various components of the system 102 of FIG. 1 or the processor 202 in FIG. 2.

At 304, the neural network model 104 may be stored in the memory 204. In accordance with an embodiment, the neural network model 104 may be trained by the processor 202 of the system 102. The neural network model 104 may be trained on a training dataset 302 that may indicate an association between the first graphic information 104A associated with one or more first objects and the corresponding first plurality of depth images 104B. In accordance with an embodiment, the first graphic information 104A may correspond to, but is not limited to, at least one of one or more images, point cloud data, a set of voxels, a three-dimensional (3D) mesh, video information, LAS (LASer) format data or proprietary format data. The first graphic information 104A may include or correspond to the one or more first objects (such as an animate or an inanimate object like chair as shown in FIG. 3) from one or more viewpoints (such as, but not limited to, a front view, a side view, a top view, a back view, a rotated view or a tilted view).

In an exemplary scenario, the training dataset 302 may include the first graphic information 104A, such as a first image 302A and a corresponding depth image, such as a second image 302B. In other words, the training dataset 302 may include an association or correspondence between the first image 302A and the second image 302B. The training dataset 302 may further include the first graphic information 104A, such as a third image 302C and a corresponding depth image, such as a fourth image 302D. In other words, the training dataset 302 may include an association or correspondence between the third image 302C and the fourth image 302D. The training dataset 302 may further include the first graphic information 104A, such as point cloud data 302E and a corresponding depth image, such as a fifth image 302F. In other words, the training dataset 302 may include an association or correspondence between the point cloud data 302E and the fifth image 302F. The training dataset 302 may further include the first graphic information 104A, such as a three-dimensional (3D) mesh 302G and a corresponding depth image, such as a sixth image 302H. In other words, the training dataset 302 may include an association or correspondence between the 3D mesh 302G and the sixth image 302H.

In accordance with an embodiment, the first graphic information 104A may include color information of the one or more first objects from different viewpoints. For example, the first graphic information 104A (such as the first image 302A or the third image 302C) may include color information (such as red, green, blue (RGB) information) of the one or more first objects (such as the chair). The first graphic information 104A may include the one or more images (for example, in a portable network graphics (PNG) format) that may depict an object, such as the chair from different viewpoints such as, but not limited to, a side view and a front view. Further, the first graphic information 104A may include the point cloud data (such as the point cloud data 302E) associated with the object, such as the chair. The first graphic information 104A may further include the 3D mesh (such as the 3D mesh 302G) associated with the chair. The first graphic information 104A about the one or more objects may be generated or modified by the 3D graphics engine 208 before or at the time of creation of the training dataset 302. The modification performed by the 3D graphics engine 208 may include, but is not limited to, rotation, re-sizing, movement, or translation). In some embodiments, the first graphic information 104A about the one or more objects may be captured from a depth sensor (not shown) before the creation of the training dataset 302. The first graphic information 104A may depict the one or more objects (such as the chair) from different viewpoints of the depth sensor (i.e. front, side, bottom, top, or view from a particular angle) or viewpoints created by the 3D graphics engine 208 at the time of modification of the first graphic information 104A which may be earlier captured by the depth sensor. The viewpoints of the object created by the 3D graphics engine 208 may be referred as capture of the object from a virtual imaging sensor of the 3D graphics engine 208.

In accordance with an embodiment, the second image 302B, the fourth image 302D, the fifth image 302F, and the sixth image 302H (shown in FIG. 3) may be referred as a first plurality of depth images 104B on which the neural network model 104 may be trained. The first plurality of depth images 104B may indicate depth information of the one or more objects from different viewpoints of at least one of the depth sensor (such as the ToF sensor, not shown) or the virtual imaging sensor of a three-dimensional (3D) graphics engine (such as the 3D graphics engine 208). The depth sensor or the 3D graphics engine 208 may be utilized for the generation of the training dataset on which the neural network model 104 is trained. However, the disclosed system 102 may use the trained neural network model 104 to predict depth information or depth values for the one or more objects (i.e. indicated in the second graphic information), without using the real depth sensor. The depth information may correspond to, for example, distance information between the depth sensor or the virtual imaging sensor and the object (such as the chair). It may be noted that, the use of the real depth sensor may be eliminated for the depth estimation of the one or more first objects by the disclosed system 102.

In accordance with an embodiment, each of the first plurality of depth images 104B (such as TOF images) may include pixels indicating different colors for different depth values associated with the one or more first objects. For example, the depth value may relate to a distance between each point on visible surface of the object (such as the chair) and the depth sensor or the virtual imaging sensor. In an example, each of the first plurality of depth images 104B may indicate a depth map, such that a first depth value for a point on the surface of the chair that is closer to the depth sensor may have a different value than a second depth value for a point on the surface of the chair that is farther to the depth sensor. In some embodiments, the depth values may be indicated by one or more colors, such that a color value (like RGB value) may decrease in gradient with increase in the distance between the object and the depth sensor. For example, close points may have a darker color or shade as compared to farther points on the visible surface of the object, at the time of capture of the objects from a particular viewpoint.

Thus, the training dataset 302 may include the first graphic information 104A such as the first image 302A, the third image 302C, the point cloud data 302E and the 3D mesh 302G. The corresponding first plurality of depth images 104B may include the second image 302B, the fourth image 302D, the fifth image 302F and the sixth image 302H, each associated or mapped with the corresponding first graphic information 104A. The second image 302B may include the depth information of the object (such as the chair) depicted in the first image 302A. The fourth image 302D may include the depth information of the object (i.e. chair) depicted in the third image 302C. Similarly, the fifth image 302F may include the depth information of the object (i.e. chair) depicted in the point cloud data 302E. Furthermore, the sixth image 302H may include the depth information of the object (i.e. chair) depicted in the 3D mesh 302G. The first graphic information 104A and the corresponding first plurality of depth images 104B may be, for example, paired data, unpaired data or a combination of both the paired data and unpaired data. The processor 202 may be configured to train the neural network model 104 on the training dataset 302 to map the first graphic information 104A with the corresponding depth image of the first plurality of depth images 104B for prediction of the depth information of the one or more first objects. It may be noted that the training dataset 302 is merely shown in FIG. 3 as an example. The training dataset 302 may include the association of the mapping between the first graphic information 104A and the first plurality of depth images 104B for different types of objects or scenes including objects, without deviating from the scope of the disclosure.

At 306, second graphic information 306A that may correspond to the one or more first objects may be received. In accordance with an embodiment, the processor 202 may be configured to receive the second graphic information 306A that may correspond to the one or more first objects (such as the chair). The second graphic information 306A may be new information (such as new image) which may not be included in the training dataset 302. The second graphic information 306A may be received from the user device 110 for prediction of the depth information associated with the one or more first objects (such as the chair) depicted in the second graphic information 306A. The second graphic information 306A may also be received from a memory (such as the memory 204) or from a database of a server (not shown).

In accordance with an embodiment, the second graphic information 306A may correspond to at least one of the one or more images, the point cloud data, the set of voxels, the 3D mesh, the video information, the LAS format data or the proprietary format data. In an example, the second graphic information 306A may be exactly similar or substantially similar to the first graphic information 104A, such as the third image 302C. In other words, the second graphic information 306A may depict an object (such as the chair) from a same viewpoint, as depicted in the first graphic information 104A (such as in the third image 302C). In some embodiments, the second graphic information 306A may depict the one or more first objects from a different viewpoint or in a different format data (such as the point cloud data or the LAS format data) that may be different or same from the first graphic information 104A. The processor 202 may further input the received second graphic information 306A to the trained neural network model 104.

At 308, the trained neural network model 104 may be applied on the received second graphic information 306A. In accordance with an embodiment, the processor 202 may be configured to apply the trained neural network model 104 on the received second graphic information 306A. The trained neural network model 104 may be, for example, an image-to-image translation model, such that the trained neural network model 104, which may receive the second graphic information 306A (which may be an image in RGB domain) as an input, to convert the received second graphic information 306A to another domain (for example, an image with depth information). For the application of the neural network model 104 on the received second graphic information 306A, the neural network model 104 may compare one or more features of the received second graphic information 306A with one or more features of each of the first graphic information 104A on which the neural network model 104 is trained. The compared features may be related to the one or more objects indicated by the first graphic information 104A and the second graphic information 306A. Based on the comparison, the neural network model 104 or the processor 202 may determine the first graphic information 104A (in the training dataset 302) for which related features substantially match with the features of the received second graphic information 306A.

At 310, a first depth image 310A may be predicted from the first plurality of depth images 104B based on the application of the trained neural network model 104 on the received second graphic information 306A. In accordance with an embodiment, the processor 202 may be configured to predict the first depth image 310A from the first plurality of depth images 104B based on the application of the trained neural network model 104 on the received second graphic information 306A. The trained neural network model 104 may predict the first depth image 310A corresponding to the second graphic information 306A input to the trained neural network model 104. The processor 202 may receive the predicted first depth image 310A corresponding to the second graphic information 306A. For example, the trained neural network model 104 may determine that the second graphic information 306A (i.e. indicating the chair object from a particular viewpoint) may substantially match with the third image 302C included in the training dataset 302 and therefore, determine or predict the fourth image 302D (as the first depth image 310A) which is associated with the third image 302C in the trained neural network model 104.

In accordance with an embodiment, the predicted first depth image 310A may indicate the depth information of the one or more first objects depicted in the received second graphic information 306A. The predicted first depth image 310A (such as TOF image) may include different colors for the different depth values associated with the one or more first objects (such as the chair). For example, as shown in FIG. 3, the color shades of the points on the surface of the chair in the first depth image 310A may decrease with a gradient, with increase in the distance of the points on the surface of the chair from a specific viewpoint. In an exemplary scenario, the first depth image 310A may be similar to the fourth image 302D, when the second graphic information 306A is similar to the third image 302C of the training dataset 302, as shown in FIG. 3. Therefore, the trained neural network model 104 may predict different depth images (or TOF images) based on the second graphic information 306A (i.e. computer-generated imagery (CGI)) information input to the trained neural network model 104.

At 312, the first depth information may be extracted from the predicted first depth image 310A. In accordance with an embodiment, the processor 202 may be configured to extract the first depth information from the predicted first depth image 310A. The first depth information may correspond to the one or more first objects indicated by the second graphic information 306A. The first depth information may include for example, distance information (distance values or XYZ information) of each point of the surface of the object (i.e. chair) depicted in the second graphic information 306A from the particular viewpoint (such as the viewpoint from which the second graphic information 306A is generated or captured). In some embodiments, the first depth information may be text format data (for example, ".SKV" file format or ".CSV" file format), such that each of the depth value may be represented by a numeric value. In an exemplary scenario, the points on the surface of the object (i.e. chair in the first depth image 310A) that may be perceived to be closer may have the depth values indicating a lower numeric value as compared to the points on the surface of the object (i.e. chair) that may be perceived to be farther in the first depth image 310A. Thus, each point of the surfaces of the one or more objects in the predicted first depth image 310A may be assigned a depth value (such as corresponding to the distance values or XYZ values) by the disclosed system 102.

The system 102 of the present disclosure may thus, allow the prediction of the depth information (such as the first depth information) based on the graphic information (such as the second graphic information 306A), without use of the real depth sensors. The prediction of the first depth image 310A by the trained neural network model 104 may be computationally advanced and time efficient as compared to the determination of depth information by conventional depth sensors. Moreover, the hardware requirement for the depth estimation may be substantially reduced in the system 102 as compared to the conventional depth sensors which may require additional hardware setup for determination of the depth information in a readable format.

Although the sequence diagram 300 is illustrated as discrete operations, such as 304, 306, 308, 310 and 312, however, in certain embodiments, such discrete operations may be further divided into additional operations, combined into fewer operations, or eliminated, depending on the particular implementation without detracting from the essence of the disclosed embodiments.

Figure 4:
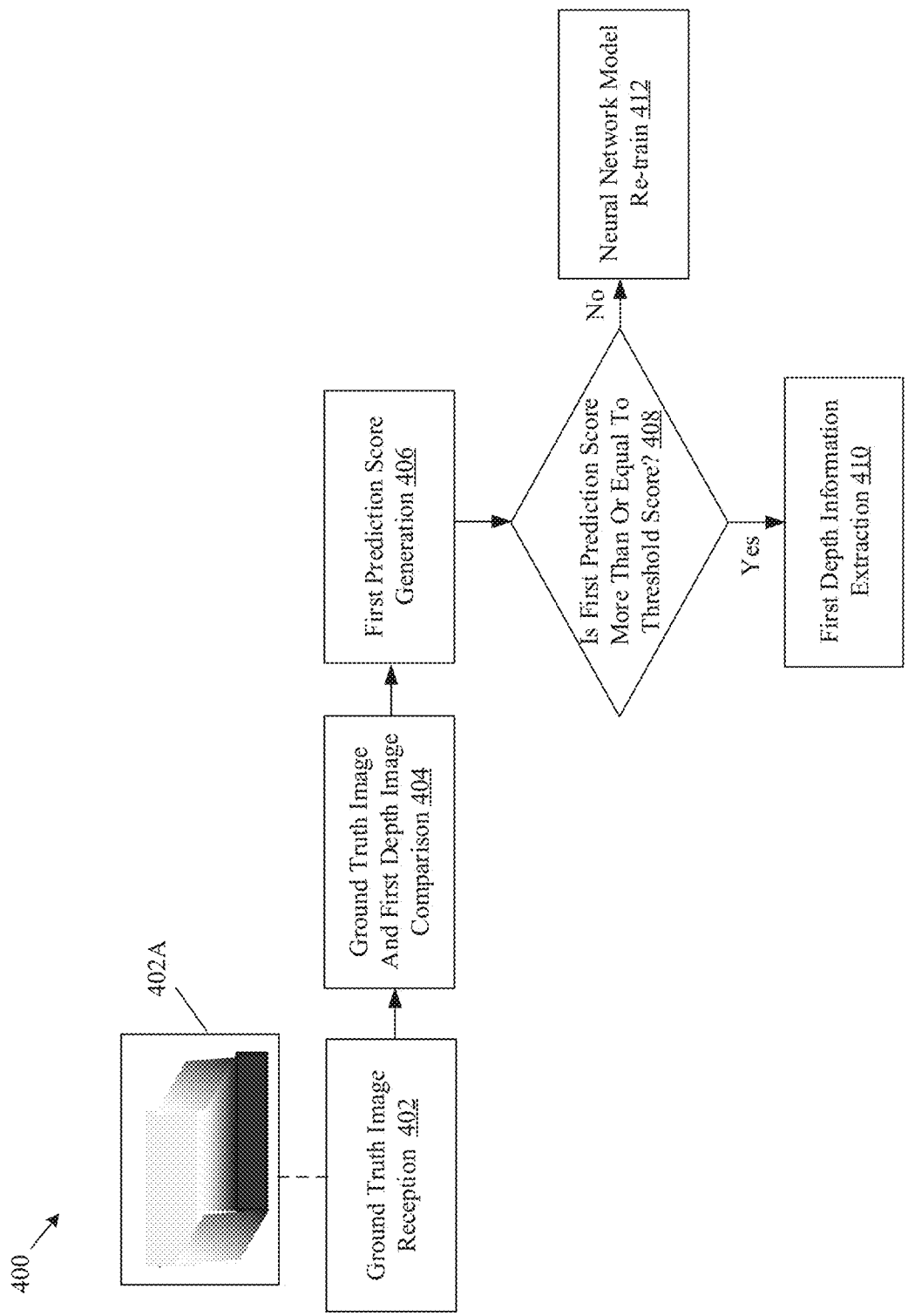
FIG. 4 is a sequence diagram for exemplary operations to check performance of trained neural network model in depth estimation, in accordance with an embodiment of the disclosure.

FIG. 4 is a sequence diagram for exemplary operations to check performance of trained neural network model in depth estimation, in accordance with an embodiment of the disclosure. FIG. 4 is explained in conjunction with elements from FIGS. 1, 2 and 3. With reference to FIG. 4, there is shown a sequence diagram 400 that illustrates a sequence of operations from 402 to 412. The sequence of operations may be executed by various components of the system 102 of FIG. 1 or the processor 202 in FIG. 2.

At 402, a ground truth image 402A corresponding to the second graphic information 306A may be received. In accordance with an embodiment, the processor 202 may be configured to receive the ground truth image 402A corresponding to the received second graphic information 306A. The ground truth image 402A may indicate the depth information associated with the one or more first objects depicted in the second graphic information 306A.

In some embodiments, the processor 202 may be configured to receive the ground truth image 402A from a 3D graphics engine (such as the 3D graphics engine 208). The ground truth image 402A may be considered a depth image with accurate depth values corresponding to the one or more first objects depicted in the second graphic information 306A. For example, the ground truth image 402A may be received from the memory 204. In one or more embodiments, the ground truth image 402A may be one of the images or other format data from the first graphic information 104A, such as the fourth image 302D (which may be generated by the 3D graphics engine 208 or the depth sensor).

At 404, the received ground truth image 402A and the first depth image 310A predicted by the neural network model 104 may be compared. In accordance with an embodiment, the processor 202 may be configured to compare the received ground truth image 402A and the first depth image 310A predicted by the neural network model 104 from the first plurality of depth images 104B. In some embodiments, each pixel of the received ground truth image 402A and the first depth image 310A may be compared to determine a similarity between the received ground truth image 402A and the first depth image 310A.

At 406, a first prediction score may be generated based on the comparison of the received ground truth image 402A and the first depth image 310A predicted by the trained neural network model 104. In accordance with an embodiment, the processor 202 may be configured to generate the first prediction score (from example between "0" to "1") based on the comparison of the received ground truth image 402A and the first depth image 310A predicted by the trained neural network model 104. The first prediction score may be indicative of a performance of the trained neural network model 104 in prediction of the depth image (such as the first depth image 310A).

In some embodiments, the processor 202 may be further configured to generate the first prediction score based on a structural similarity index measure. The structural similarity index measure may be defined in a range of "0" to "1". For example, the processor 202 may generate the first prediction score based on the structural similarity index measure as "1", when the received ground truth image 402A and the predicted first depth image 310A are exactly similar. In another example, the processor 202 may generate the first prediction score based on the structural similarity index measure as "0", when the received ground truth image 402A and the predicted first depth image 310A have the least similarity between each other. Thus, the first prediction score near to the value "1" may indicate that the first depth image 310A predicted by the trained neural network model 104 may be more accurate as compared to the first prediction score near to the value "0". Therefore, it may be implied that the first prediction score nearer to the value "1" may indicate a better performance of the trained neural network model 104 in the prediction of the first depth image 310A.

At 408, it is determined whether the generated first prediction score is more than or equal to a threshold score. In accordance with an embodiment, the processor 202 may be configured to determine if the generated first prediction score is more than or equal to the threshold score. The threshold score may indicate a minimum performance parameter for the trained neural network model 104. For example, the threshold score may be "0.9". Thus, the processor 202 may determine that the first prediction score more than or equal to the threshold score of "0.9", indicates a satisfactory prediction of the depth image (such as the first depth image 310A) from the trained neural network model 104.

At 410, the first depth information may be extracted from the predicted first depth image 310A based on a determination that the first prediction score is more than or equal to the threshold score. In accordance with an embodiment, the processor 202 may be configured to extract the first depth information from the predicted first depth image 310A based on the determination that the first prediction score is more than or equal to the threshold score. For example, the first prediction score may be "0.94". Thus, the processor 202 may extract the first depth information from the predicted first depth image 310A. The details of the extraction of the first depth information from the predicted first depth image 310A are described, for example, at 312 of FIG. 3.

At 412, the neural network model 104 may be re-trained based on a determination that the first prediction score is less the threshold score. In accordance with an embodiment, the processor 202 may be configured to re-train the neural network model 104 based on the determination that the first prediction score is less the predefined threshold score. For example, the neural network model 104 may be re-trained if the first prediction score for the prediction of the first depth image 310A is less than the threshold score of "0.9". Thus, the system 102 of the present disclosure may allow re-training of the neural network model 104 for enhancement of the performance of the neural network model 104 in prediction of the accurate depth images associated with the graphic information input to the neural network model 104.

Although the sequence diagram 400 is illustrated as discrete operations, such as 402, 404, 406, 408, 410 and 412, however, in certain embodiments, such discrete operations may be further divided into additional operations, combined into fewer operations, or eliminated, depending on the particular implementation without detracting from the essence of the disclosed embodiments.

Figure 5:
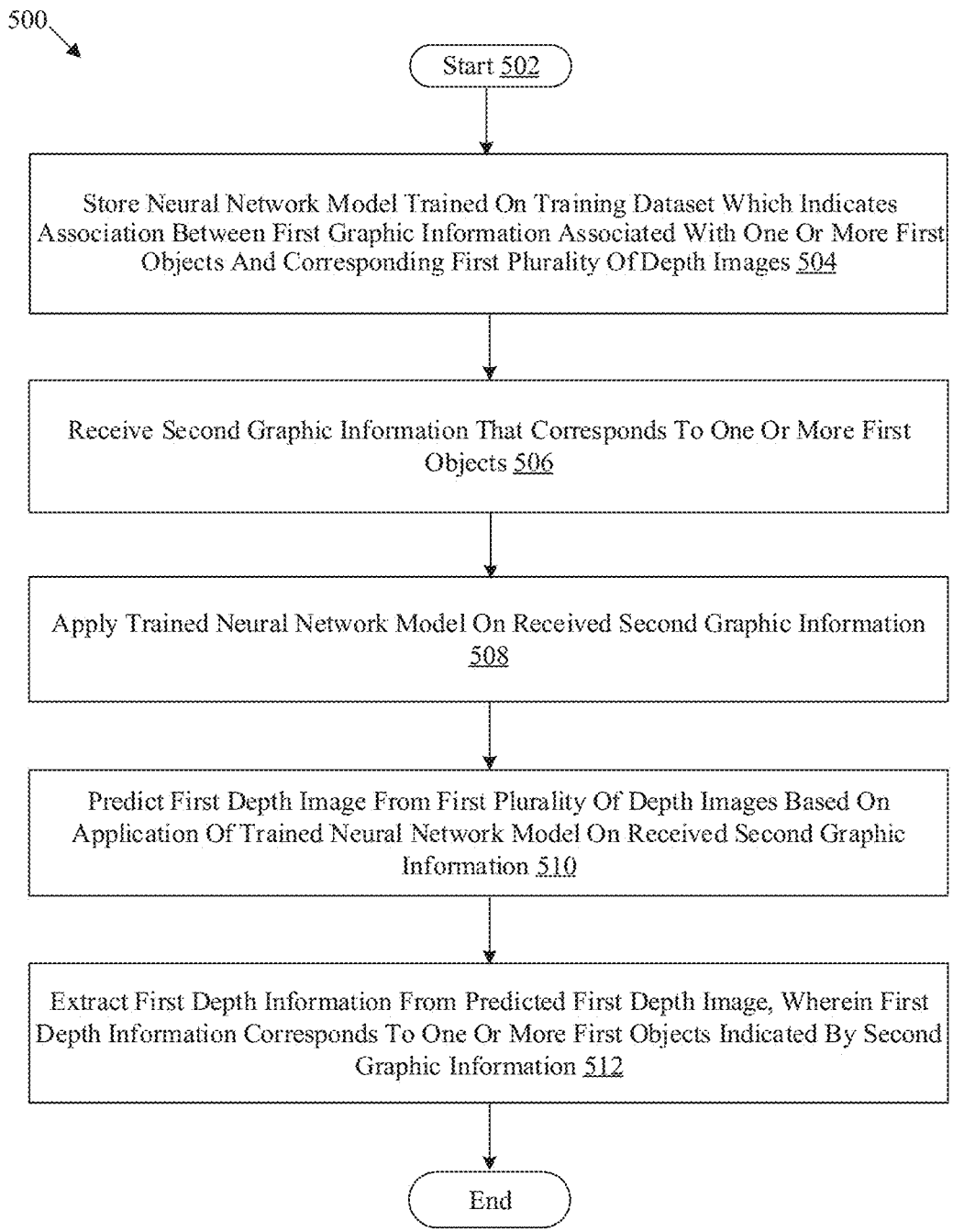
FIG. 5 is a flowchart that illustrates an exemplary method for neural network model based depth estimation, in accordance with an embodiment of the disclosure.

FIG. 5 is a flowchart that illustrates an exemplary method for neural network model based depth estimation, in accordance with an embodiment of the disclosure. FIG. 5 is described in conjunction with elements from FIGS. 1, 2, 3, and 4. With reference to FIG. 5, there is shown a flowchart 500. The exemplary method of the flowchart 500 may be executed by any computing system, for example, by the system 102 of FIG. 1 or the processor 202 of FIG. 2. The exemplary method of the flowchart 500 may start at 502 and proceed to 504.

At 504, the neural network model 104 may be stored in the memory 204. In accordance with an embodiment, the memory 204 may be configured to store the neural network model 104. The neural network model 104 may be trained on a training dataset (such as the training dataset 302) which may indicate an association between first graphic information 104A associated with one or more first objects and corresponding first plurality of depth images 104B. The processor 202 may be configured to train the neural network model 104 for prediction of the first depth image 108. The storage of the neural network model 104 in the memory 204 and training of the neural network model 104 is described, for example, at 304 in FIG. 3.

At 506, the second graphic information 106 may be received. In accordance with an embodiment, the processor 202 may be configured to receive the second graphic information 106 that may correspond to the one or more first objects. The second graphic information 106 may be for example, one or more images, the point cloud data, the set of voxels, the 3D mesh, video information, the LAS (LASer) format data the proprietary format data, or computer-generated imagery (CGI) information. The receipt of the second graphic information 106 is described, for example, at 306 in FIG. 3.

At 508, the trained neural network model 104 may be applied on the second graphic information 106. In accordance with an embodiment, the processor 202 may be configured to apply the trained neural network model 104 on the second graphic information 106. The neural network model 104 may be applied on the second graphic information 106 for the prediction of the first depth image 108. The application of the neural network model 104 on the second graphic information 106 is described, for example, at 308 in FIG. 3.

At 510, the first depth image 108 may be predicted from the first plurality of depth images 104B. In accordance with an embodiment, the processor 202 may be configured to predict the first depth image 108 (such a time-of-flight (TOF) image) from the first plurality of depth images 104B based on the application of the trained neural network model 104 on the second graphic information 106. The prediction of the first depth image 108 from the first plurality of depth images 104B based on the application of the trained neural network model 104 is described, for example, at 310 in FIG. 3.

At 512, the first depth information may be extracted from the predicted first depth image 108. In accordance with an embodiment, the processor 202 may be configured to extract the first depth information (i.e. distance information) from the predicted first depth image 108. The first depth information may correspond to the one or more first objects indicated by the second graphic information 106. The extraction of the first depth information from the predicted first depth image 108 is described, for example, at 312 in FIG. 3. Control may pass to end.

Although the flowchart 500 illustrates discrete operations, such as 504, 506, 508, 510 and 512 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer (for example the system 102). The instructions may cause the machine and/or computer (for example the system 102) to perform operations that include storage of neural network model (such as the neural network model 104). The neural network model 104 may be trained on a training dataset (such as the training dataset 302) which may indicate an association between first graphic information 104A associated with one or more first objects and corresponding first plurality of depth images (such as the first plurality of depth images 104B). The operations may further include receipt of second graphic information (such as the second graphic information 106) that may correspond to the one or more first objects. The operations may further include application of the trained neural network model 104 on the received second graphic information 106. The operations may further include prediction of a first depth image (such as the first depth image 108) from the first plurality of depth images 104B based on the application of the trained neural network model 104 on the received second graphic information 106. The operations may further include extraction of first depth information from the predicted first depth image 108. The first depth information may correspond to the one or more first objects indicated by the second graphic information 106.

Exemplary aspects of the disclosure may include a system (such as the system 102) that may include a processor (such as the processor 202). The system 102 may further include a memory configured to store neural network model (such as the neural network model 104). The neural network model 104 may be trained on a training dataset (such as the training dataset 302) which may indicate an association between first graphic information 104A associated with one or more first objects and corresponding first plurality of depth images 104B. The processor 202 may be further configured to receive of second graphic information (such as the second graphic information 106) that may correspond to the one or more first objects. The processor 202 may be further configured to apply the trained neural network model 104 on the received second graphic information 106. The processor 202 may be further configured to predict a first depth image (such as the first depth image 108) from the first plurality of depth images 104B based on the application of the trained neural network model 104 on the received second graphic information 106. The processor 202 may be further configured to extract first depth information from the predicted first depth image 108. The first depth information may correspond to the one or more first objects indicated by the second graphic information 106.

In accordance with an embodiment, the first graphic information 104A may include color information of the one or more first objects from different viewpoints. In accordance with an embodiment, the first plurality of depth images 104B may indicate depth information of the one or more first objects from different viewpoints of at least one of a depth sensor or a virtual imaging sensor of a three-dimensional (3D) graphics engine (such as the 3D graphics engine 208).

In accordance with an embodiment, each of the first plurality of depth images 104B may include a different color for a different depth value associated with the one or more first objects. In accordance with an embodiment, the first graphic information 104A and the second graphic information 106 may correspond to at least one of one or more images, point cloud data, a set of voxels, a three-dimensional (3D) mesh, video information, LAS (LASer) format data or proprietary format data.

In accordance with an embodiment, the processor 202 may be further configured to receive a ground truth image (such as the ground truth image 402A) corresponding to the received second graphic information 106. The ground truth image 402A may indicate depth information associated with the one or more first objects depicted in the second graphic information 106. The processor 202 may further compare the received ground truth image 402A with the first depth image 108 predicted by the neural network model 104 from the first plurality of depth images 104B. The processor 202 may further generate a first prediction score based on the comparison of the received ground truth image 402A and the first depth image 108 predicted by the trained neural network model 104. In accordance with an embodiment, the processor 202 may be further configured to extract the first depth information from the predicted first depth image 108, based on a determination that the first prediction score is more than or equal to a threshold score. In accordance with an embodiment, the processor 202 may be configured to generate the first prediction score based on a structural similarity index measure. In accordance with an embodiment, the processor 202 may be configured to receive the ground truth image 402A from the 3D graphics engine 208.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
    a memory configured to store a neural network model trained on a training dataset which indicates an association between first graphic information associated with one or more first objects and corresponding first plurality of depth images; and
    a processor configured to:
        receive second graphic information that corresponds to the one or more first objects;
        apply the trained neural network model on the received second graphic information;
        predict a first depth image from the first plurality of depth images based on the application of the trained neural network model on the received second graphic information;
        receive a ground truth image corresponding to the received second graphic information, wherein the ground truth image indicates first depth information associated with the one or more first objects depicted in the second graphic information;
        compare the received ground truth image with the first depth image predicted by the neural network model from the first plurality of depth images;
        generate a first prediction score based on the comparison of the received ground truth image with the first depth image predicted by the trained neural network model; and
        extract the first depth information from the predicted first depth image and the first prediction score, wherein the first depth information corresponds to the one or more first objects indicated by the second graphic information.

2. The system according to claim 1, wherein the first graphic information includes color information of the one or more first objects from different viewpoints.

3. The system according to claim 1, wherein the first plurality of depth images indicates second depth information of the one or more first objects from different viewpoints of at least one of a depth sensor or a virtual imaging sensor of a three-dimensional (3D) graphics engine.

4. The system according to claim 1, wherein each of the first plurality of depth images includes a different color for a different depth value associated with the one or more first objects.

5. The system according to claim 1, wherein the first graphic information and the second graphic information correspond to at least one of one or more images, point cloud data, a set of voxels, a three-dimensional (3D) mesh, video information, LAS (LASer) format data or proprietary format data.

6. The system according to claim 1, wherein the processor is further configured to extract the first depth information from the predicted first depth image, based on a determination that the generated first prediction score is more than or equal to a threshold score.

7. The system according to claim 1, wherein the processor is further configured to generate the first prediction score based on a structural similarity index measure.

8. The system according to claim 1, wherein the processor is configured to receive the ground truth image from a three-dimensional (3D) graphics engine.

9. A method, comprising:
    in a system:
        storing a neural network model trained on a training dataset which indicates an association between first graphic information associated with one or more first objects and corresponding first plurality of depth images;
        receiving second graphic information that corresponds to the one or more first objects;
        applying the trained neural network model on the received second graphic information;
        predicting a first depth image from the first plurality of depth images based on the application of the trained neural network model on the received second graphic information;
        receiving a ground truth image corresponding to the received second graphic information, wherein the ground truth image indicates first depth information associated with the one or more first objects depicted in the second graphic information;
        comparing the received ground truth image with the first depth image predicted by the neural network model from the first plurality of depth images;
        generating a first prediction score based on the comparison of the received ground truth image with the first depth image predicted by the trained neural network model; and
        extracting the first depth information from the predicted first depth image and the first prediction score, wherein the first depth information corresponds to the one or more first objects indicated by the second graphic information.

10. The method according to claim 9, wherein the first graphic information includes color information of the one or more first objects from different viewpoints.

11. The method according to claim 9, wherein the first plurality of depth images indicates second depth information of the one or more first objects from different viewpoints of at least one of a depth sensor or a virtual imaging sensor of a three-dimensional (3D) graphics engine.

12. The method according to claim 9, wherein each of the first plurality of depth images includes a different color for a different depth value associated with the one or more first objects.

13. The method according to claim 10, wherein the first graphic information and the second graphic information correspond to at least one of one or more images, point cloud data, a set of voxels, a three-dimensional (3D) mesh, video information, LAS (LASer) format data or proprietary format data.

14. The method according to claim 9, further comprising extracting the first depth information from the predicted first depth image, based on a determination that the generated first prediction score is more than or equal to a threshold score.

15. The method according to claim 9, wherein the generated first prediction score is based on a structural similarity index measure.

16. A non-transitory computer-readable medium having stored thereon computer implemented instructions that, when executed by a system, causes the system to execute operations, the operations comprising:
storing a neural network model trained on a training dataset which indicates an association between first graphic information associated with one or more first objects and corresponding first plurality of depth images;
receiving second graphic information that corresponds to the one or more first objects;
applying the trained neural network model on the received second graphic information;
predicting a first depth image from the first plurality of depth images based on the application of the trained neural network model on the received second graphic information;
receiving a ground truth image corresponding to the received second graphic information, wherein the ground truth image indicates depth information associated with the one or more first objects depicted in the second graphic information;
comparing the received ground truth image with the first depth image predicted by the neural network model from the first plurality of depth images;
generating a first prediction score based on the comparison of the received ground truth image with the first depth image predicted by the trained neural network model; and
extracting the depth information from the predicted first depth image and the first prediction score, wherein the first depth information corresponds to the one or more first objects indicated by the second graphic information.

17. The non-transitory computer-readable medium according to claim 16, wherein the first graphic information and the second graphic information correspond to at least one of one or more images, point cloud data, a set of voxels, a three-dimensional (3D) mesh, video information, LAS (LASer) format data or proprietary format data.

18. The non-transitory computer-readable medium according to claim 16, wherein each of the first plurality of depth images includes a different color for a different depth value associated with the one or more first objects.

* * * * *